United States Patent
Shin et al.

(10) Patent No.: US 12,036,983 B2
(45) Date of Patent: Jul. 16, 2024

(54) METHOD FOR DETECTING DRIVER'S HANDS ON/OFF STEERING WHEEL DURING DRIVING AND SYSTEM THEREOF

(71) Applicants: Hyundai Motor Company, Seoul (KR); Kia Corporation, Seoul (KR)

(72) Inventors: Seok-Young Shin, Gyeonggi-do (KR); Seung-Ho Lee, Gyeonggi-do (KR); Ho-Seok Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 381 days.

(21) Appl. No.: 17/364,115

(22) Filed: Jun. 30, 2021

(65) Prior Publication Data

US 2022/0289181 A1 Sep. 15, 2022

(30) Foreign Application Priority Data

Mar. 12, 2021 (KR) .................. 10-2021-0032583

(51) Int. Cl.
*B60W 30/12* (2020.01)
*B60W 40/08* (2012.01)
(Continued)

(52) U.S. Cl.
CPC ............ *B60W 30/12* (2013.01); *B60W 40/08* (2013.01); *B60W 50/14* (2013.01);
(Continued)

(58) Field of Classification Search
CPC ...... B60W 30/12; B60W 40/08; B60W 50/14; B60W 2040/0818; B60W 2050/0054;
(Continued)

(56) References Cited

U.S. PATENT DOCUMENTS

2019/0126981 A1* 5/2019 Goering ................. G05D 1/021
2020/0353978 A1* 11/2020 Hwang ................. B60W 50/08
(Continued)

FOREIGN PATENT DOCUMENTS

KR 2010-0000388 A 1/2010

*Primary Examiner* — Jason Holloway
*Assistant Examiner* — Madison B Emmett
(74) *Attorney, Agent, or Firm* — Fox Rothschild LLP (57) ABSTRACT

A driver's hands on/off detection system for detecting whether a driver's hands are on/off a steering wheel during driving is applied to a vehicle. When a driving assistance system is operated by a controller during driving, the driver's hands on/off detection system calculates an electronic motor driven power steering system (MDPS) torque representative value and a vehicle measurement data representative value as a representative value ratio between sensors, and divides a disturbance driving area and a normal driving area by a magnitude of the representative value ratio between sensors to perform sensor detection correction control of a hands on/off check using a disturbance torque threshold to the torque filtering value or torque-based sensing control of a hands on/off check using an upper/lower torque limit value to the torque filtering value, thereby reducing the hands on/off detection errors during driving with only a vehicle-mounted sensor without using a capacitive sensor.

17 Claims, 8 Drawing Sheets

(51) Int. Cl.
 *B60W 50/00* (2006.01)
 *B60W 50/14* (2020.01)
(52) U.S. Cl.
 CPC ............... *B60W 2040/0818* (2013.01); *B60W 2050/0054* (2013.01); *B60W 2050/146* (2013.01); *B60W 2510/0661* (2013.01); *B60W 2520/105* (2013.01); *B60W 2520/28* (2013.01); *B60W 2520/30* (2013.01); *B60W 2540/223* (2020.02)
(58) Field of Classification Search
 CPC ... B60W 2050/146; B60W 2510/0661; B60W 2520/105; B60W 2520/28; B60W 2520/30; B60W 2540/223; B60W 40/09; B60W 50/16; B60W 10/20; B60W 40/107; B60W 2050/0002; B60W 2050/0052; B60W 2050/143; B62D 6/007; B62D 15/025; B62D 1/046; B62D 6/10; B60Y 2400/3032; B60Y 2400/307
 See application file for complete search history.

(56) References Cited

U.S. PATENT DOCUMENTS

| | | | |
|---|---|---|---|
| 2022/0097762 A1* | 3/2022 | Miyake | B62D 5/0463 |
| 2023/0294762 A1* | 9/2023 | Millsap | B62D 15/025 |
| | | | 701/41 |

* cited by examiner

METHOD FOR DETECTING DRIVER'S HANDS ON/OFF STEERING WHEEL DURING DRIVING AND SYSTEM THEREOF

CROSS-REFERENCE TO RELATED APPLICATION

This application claims under 35 U.S.C. § 119(a) the benefit of Korean Patent Application No. 10-2021-0032583, filed on Mar. 12, 2021, the entire contents of which are incorporated herein by reference.

BACKGROUND

(a) Technical Field

The present disclosure relates to a method and system for detecting a driver's hands on/off a steering wheel during driving, more particularly, to the system for detecting hands on/off detection performance during operation of a driving assistance system, without using a capacitive sensor.

(b) Description of the Related Art

In general, an automatically commanded steering function (ACSF) for a vehicle continuously detects whether or not a driver is holding a steering wheel (that is, hands on/off), to check a lane keeping function in an operating state of a driving assistance system while the vehicle is being driven, and prescribes that it is necessary to issue a warning when the driver's hands are taken off the steering wheel while the driving assistance system is in operation.

As such, the driving assistance system, which must detect the driver's hands being on/off the steering wheel, may include a lane keeping assist (LKA) system and a lane following assist (LFA) system, for example. In this case, the LKA operates only when there is a risk of departure from a lane, and the LFA is always operated.

Therefore, the LKA and the LFA require a driver's hands on/off detection function when the system is in operation, and examples to meet these requirements are driver's hands on/off detection functions using a sensor application detection direct method and a post-process calculation indirect determination method.

For example, the sensor application detection direct method is a method which directly uses a capacitive sensor to determine the driver's hands on/off by installing the capacitive sensor on the steering wheel, whereas the post-processing calculation indirect determination method receives the driver's torque input of an electronic motor driven power steering system (MDPS), performs post-processing of a measurement value of the torque sensor in order to generate additional torque accordingly and uses the value of this torque sensor to indirectly determine the driver's hands on/off.

However, the post-process calculation indirect determination method has the following limitations by determining hands on/off using the torque sensor of the MDPS.

For example, the post-process calculation indirect determination method monitors an absolute amount and a change amount of torque measured by the torque sensor of the MDPS, but in this method, noise may be transferred to a torque measurement value due to a surrounding road surface condition (for example, a driving condition such as passing on a barrier, a manhole, and so on).

In particular, in the case of such torque measurement value noise, since it is encountered that only one sensor is used to detect the driver's hands on/off, if a threshold for determining hands off is set to be low, even a hands off situation may be erroneously detected as a hands on situation to be likely to violate the law, and on the other hand, if the threshold is set to be high, even a hands on situation may be erroneously detected as a hands off situation to cause a hands off warning, resulting in customer complaints.

SUMMARY

Accordingly, an object of the present disclosure is to provide a method and system for detecting a driver's hands on/off a steering wheel during driving, which substantially improve driver's hands on/off detection performance during driving by a torque sensor of an MDPS, so that it is possible to provide the driver's hands on/off information required in an operation state of a driving assistance system without using of a capacitive sensor, and in particular, apply a correction process to a post-processing result of a torque sensor measurement value by using measurement values of a longitudinal acceleration sensor and a wheel speed sensor being basic detection means of the vehicle, as disturbance or external noise, so that an error in a detection value is reduced due to division of a disturbance driving area and a normal driving area for the driver's hands on/off detection.

A method for detecting a driver's hands on/off a steering wheel during driving according to the present disclosure includes: a sensor detection step of calculating an MDPS torque representative value for a torque detection value of a torque sensor of an MDPS by the frequency filtering process and a vehicle measurement data representative value for a sensor detection value of a vehicle-mounted sensor during the operation of a driving assistance system by a controller in a driving state of the vehicle; a disturbance variable selection step of calculating a representative value ratio between sensors as a ratio of the MDPS torque representative value and the vehicle measurement data representative value, a disturbance condition check step of dividing a disturbance driving area and a normal driving area by a magnitude of the ratio of the representative value between sensors in a state in which the torque sensor detection value is checked; and a detection logic dualization step of varying a torque filtering value of the torque sensor detection value applying to a disturbance-based detection step which detects the driver's hands on or hands off in the disturbance driving area and a torque-based detection step which detects the driver's hands on or hands off in the normal driving area.

In a preferred embodiment, the driving assistance system is a lane keeping assist (LKA) system which returns a vehicle to an inside of a lane when the vehicle departs from the lane or a lane following assist (LFA) system which allows the vehicle to travel along the center of the lane.

In a preferred embodiment, the vehicle-mounted sensor is a longitudinal acceleration sensor which detects a longitudinal acceleration of the vehicle, and a wheel speed sensor which detects wheel speeds for left/right front wheels and left/right rear wheels of the vehicle.

In a preferred embodiment, the sensor detection step is performed a step in which is extracted disturbance frequency signals by pre-processing the frequency filtering process for the torque sensor detection value and the sensor detection value in real time, and a step in which is selected a representative value from the disturbance frequency signals to determine the vehicle measurement data representative value and the MDPS torque representative value.

In a preferred embodiment, the selection of the representative value is determined by applying any one of peak-peak, overall level, and amplitude to the disturbance frequency signal.

In a preferred embodiment, the disturbance variable selection step is performed by obtaining dispersions for the MDPS torque representative value and the vehicle measurement data representative value, and linearizing the dispersions, and calculating a ratio of the vehicle measurement data representative value and the MDPS representative value from linearization processing results, and calculating a representative value ratio between sensors as a ratio calculation value.

In a preferred embodiment, a representative value ratio between sensors is calculated by applying a margin to a threshold of the ratio calculation value.

In a preferred embodiment, the disturbance condition check step applies a torque sensor threshold for the torque sensor detection value and a disturbance driving threshold for the ratio of the representative values between the sensors, as variables, and divides the disturbance driving area and the normal driving area according to a magnitude relationship of the variables.

In a preferred embodiment, the disturbance driving area is a case in which the torque sensor detection value is larger than the torque sensor threshold and the ratio of the representative value between sensors is larger than the disturbance driving threshold, whereas the normal driving area is a case in which is checked as the normal driving area when torque sensor detection value is larger than the torque sensor threshold value, but the ratio of the representative values between sensors is less than the disturbance driving threshold value.

In a preferred embodiment, the disturbance-based detection step is performed by applying a disturbance torque threshold to a torque filtering value of the torque detection value, and comparing the torque filtering value with the disturbance torque threshold, recognizing hands on check when the torque filtering value is less than the disturbance torque threshold, and recognizing hands off check when the torque filtering value is larger than the disturbance torque threshold.

In a preferred embodiment, a hands on detection holding mode of holding check for the hands on is applied when the torque filtering value is larger than the disturbance torque threshold.

In a preferred embodiment, the torque-based detection is performed by applying a torque threshold and a torque change rate to a torque filtering value of the torque detection value, and comparing the torque filtering value with any one of the torque threshold and the torque change rate, recognizing hands on check when the torque filtering value is less than any one of the torque threshold and the torque change rate, and recognizing hands off check when the torque filtering value is larger than any one of the torque threshold and the torque change rate.

In a preferred embodiment, the step of recognizing hands off check turns on a warning lamp.

And the driver's hands on/off detection system of the present disclosure for achieving the object includes a controller configured to calculates an MDPS torque representative value of a torque detection value and a vehicle measurement data representative value of a sensor detection value calculated by a frequency filtering process during an operation of a driving assistance system in a driving state of a vehicle, as a representative value ratio between sensors, divide a disturbance driving area and a normal driving area by a magnitude of the ratio of the representative values between sensors in a state in which the torque detection value is checked, and perform sensor detection correction control in which hands on/off check on a steering wheel is recognized by applying a disturbance torque threshold to a torque filtering value of the torque detection value in the disturbance driving area or torque-based detection control in which hands on/off check on the steering wheel is recognized by applying an upper torque limit value and a lower torque limit value to a torque filtering value of the torque detection value in the normal driving area; a longitudinal acceleration sensor and a wheel speed sensor detecting the sensor detection values to transmit the controller; and a torque sensor mounted on an MDPS and detecting the torque detection value to transmit the controller.

In a preferred embodiment, the controller is connected with a warning lamp, and the controller turns on the warning lamp when the hands off on the steering wheel is checked.

Driver's hands on/off detection control during driving implemented in the driver's hands on/off detection system of a vehicle of the present disclosure provides the following benefits.

First, information on the driver's hands on/off detection on a steering wheel determined when a lane keeping function intervenes during driving may be provided even without applying a capacitive sensor directly installed on the steering wheel. Second, the detection accuracy of the driver's hands on/off, which was a problem when only a torque sensor is applied, is improved by using existing vehicle-mounted sensors together with a torque sensor of an MDPS. Third, errors in the driver's hands on/off detection by the separation of a noise condition and a normal driving condition may be significantly reduced by utilizing measurement values of a steering column torque sensor, a vehicle accelerometer and a vehicle wheel speed sensor among the vehicle-mounted sensors for determining a disturbance area of external noise generation. Fourth, since the disturbance area hands on/off determination may be used separately, the degree of freedom in an existing threshold of hands on/off applied during normal driving may be further increased, thereby reducing customer complaints due to misdetection of hands off in principle. Fifth, since a hands off detection logic may be taken separately according to a disturbance condition and a normal driving condition, the degree of freedom for setting a parameter is increased. Sixth, since it may suppress a misdetection with hands on in case of disturbance, it is possible to reduce a possibility of violation of laws and regulations of an automatically commanded steering function (ACSF) due to the misdetection of hands on upon hands off.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present disclosure will be described in detail with reference to the accompanying exemplary drawings, and the exemplary embodiment represents an example and may be implemented in various different forms by those skilled in the art to which the present disclosure pertains, and thus is not limited to the exemplary embodiment described herein.

Figure 1A:
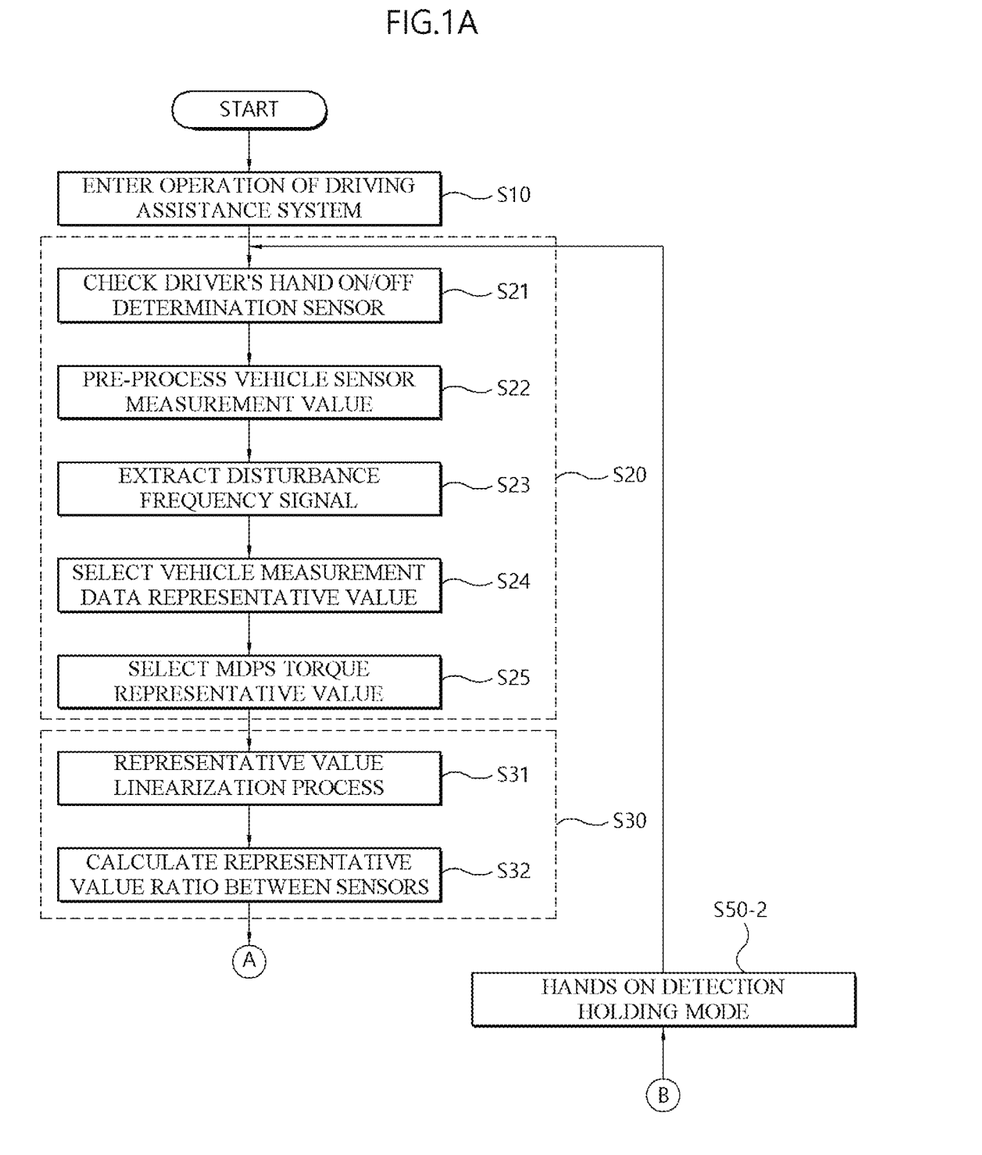
FIGS. 1A and 1B are flow charts of a method for detecting a driver's hands on/off during driving of a vehicle according to the present disclosure.
Figure 1B:
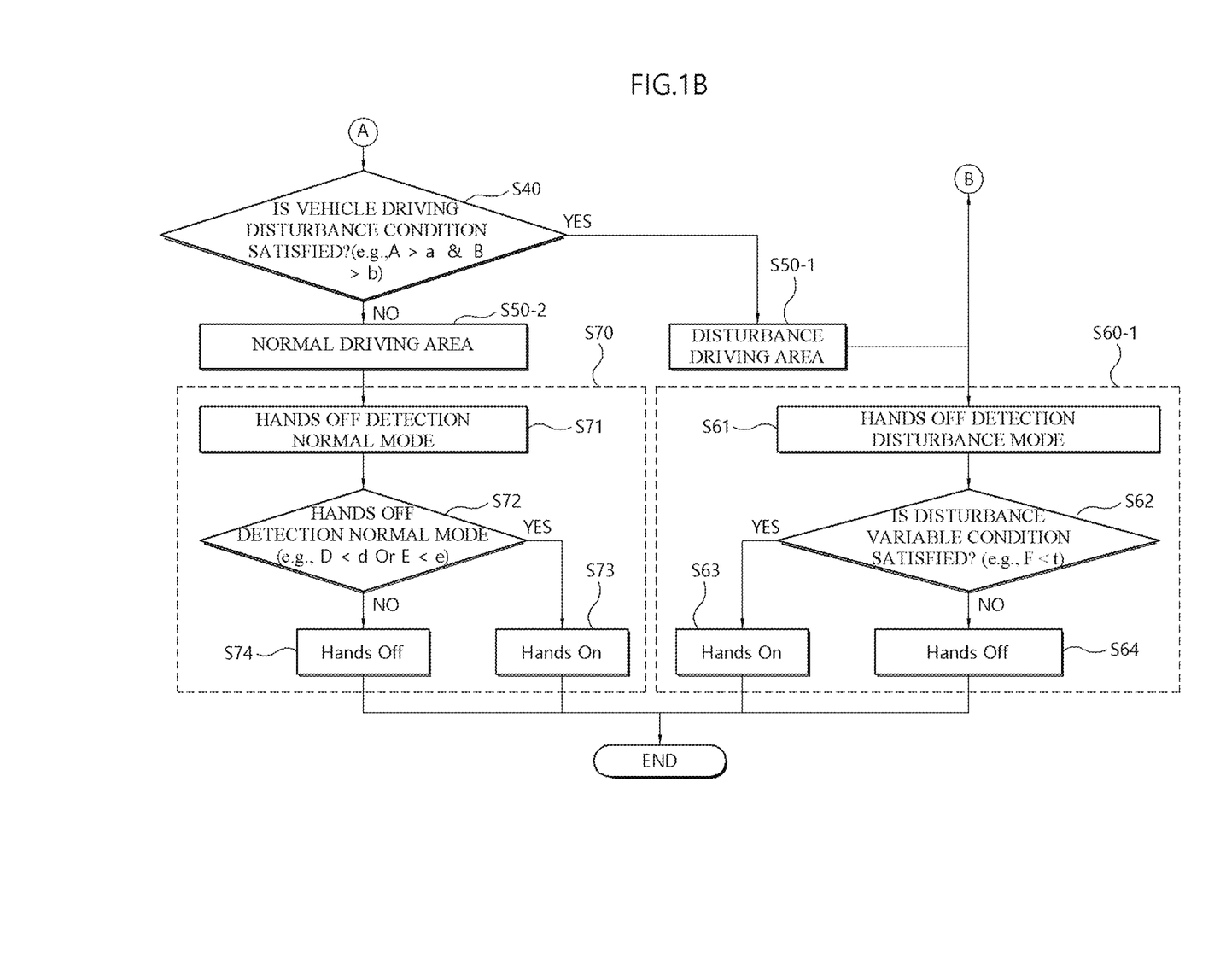

Referring to FIGS. 1A and 1B, a method for detecting a driver's hands on/off a steering wheel during driving is implemented by differently applying (S40-S70) a torque sensor detection value of a torque sensor which detects the driver's hands on or hands off in a disturbance driving area (S50-1) and a normal driving area (S50-2) divided by calculating (S10-S30) the ratio of detected values of a torque sensor and a vehicle-mounted sensor during an operation (S10) of a driving assistance system by a controller (see FIG. 2) while a vehicle is driven.

For example, the differently applying of the torque sensor detection value checks a torque detection value of the torque sensor provided in an electronic motor driven power steering system (MDPS) during an operation of the driving assistance system, and is performed by detection logic dualization control of varying the torque filtering value of the torque sensor detection value applied to disturbance-based detection of detecting the driver's hands on or hands off in the disturbance area or torque-based detection of detecting the driver's hands on or hands off in the normal driving area.

Specifically, the detection logic dualization control checks the disturbance driving area (S50-1) and the normal driving area (S50-2) for a disturbance condition (S40) after disturbance variable selection step (S30) is performed through sensor detection step (S20) in the operation (that is, in a activation state) condition (S10) of the driving assistance system, and thereby, performs the detection logic dualization control (S60-1, S-70) of varying the torque filtering value for the torque sensor detection value applied to disturbance-based detection (S60-1) that detects the driver's hands on or hands off in the disturbance driving area (S50-1) and torque-based detection (S70) that detects the driver's hands on or hands off in the normal driving area (S50-2).

In this case, driving assistance in the operating condition (S10) of the driving assistance system means lane keeping control and lane following assist control. In this case, the activation of the driving assistance system is checked by a vehicle driving state or the manipulation of a driving assistance button.

In particular, the sensor detection step (S20) is linked with an MDPS torque sensor using an acceleration sensor and a wheel speed sensor as disturbance detection means, and the disturbance variable selection control (S30) considers the acceleration sensor, the wheel speed sensor and the MDPS torque sensor together.

In addition, the detection logic dualization control (S60-1, S70) performs driver's hands off detection on a steering wheel by any one among disturbance-based detection (S60-1), disturbance-based detection holding (S60-1), and torque-based detection (S70). Therefore, the disturbance-based detection (S60-1) and the torque-based detection (S70) may exclude influence of disturbance on the hands off detection by the MDPS torque sensor by differently applying an MDPS torque value.

Therefore, the driver's hands on/off detection method during driving may separately use the disturbance area hands on/off determination so that a degree of freedom of setting for a threshold of the existing hands off determination during normal driving that is not affected by disturbance may increase, may improve the detection performance to reduce the possibility of violation of laws due to hands on misdetection upon hands off since misdetection may be suppressed by maintaining the driver's hands on in a driving situation which is influenced by disturbance while the driving assistance system is in operation, and may increase a degree of freedom of setting a parameter for a hands off detection logic since misdetections variables may be separately considered for disturbance and normal driving.

As a result, the method of detecting the driver's hands on/off during driving may improve an accuracy of a logic which detects the driver's hands on/off, while the MDPS torque sensor is used as it is for the lane keeping control and the lane following assist control.

Figure 2:
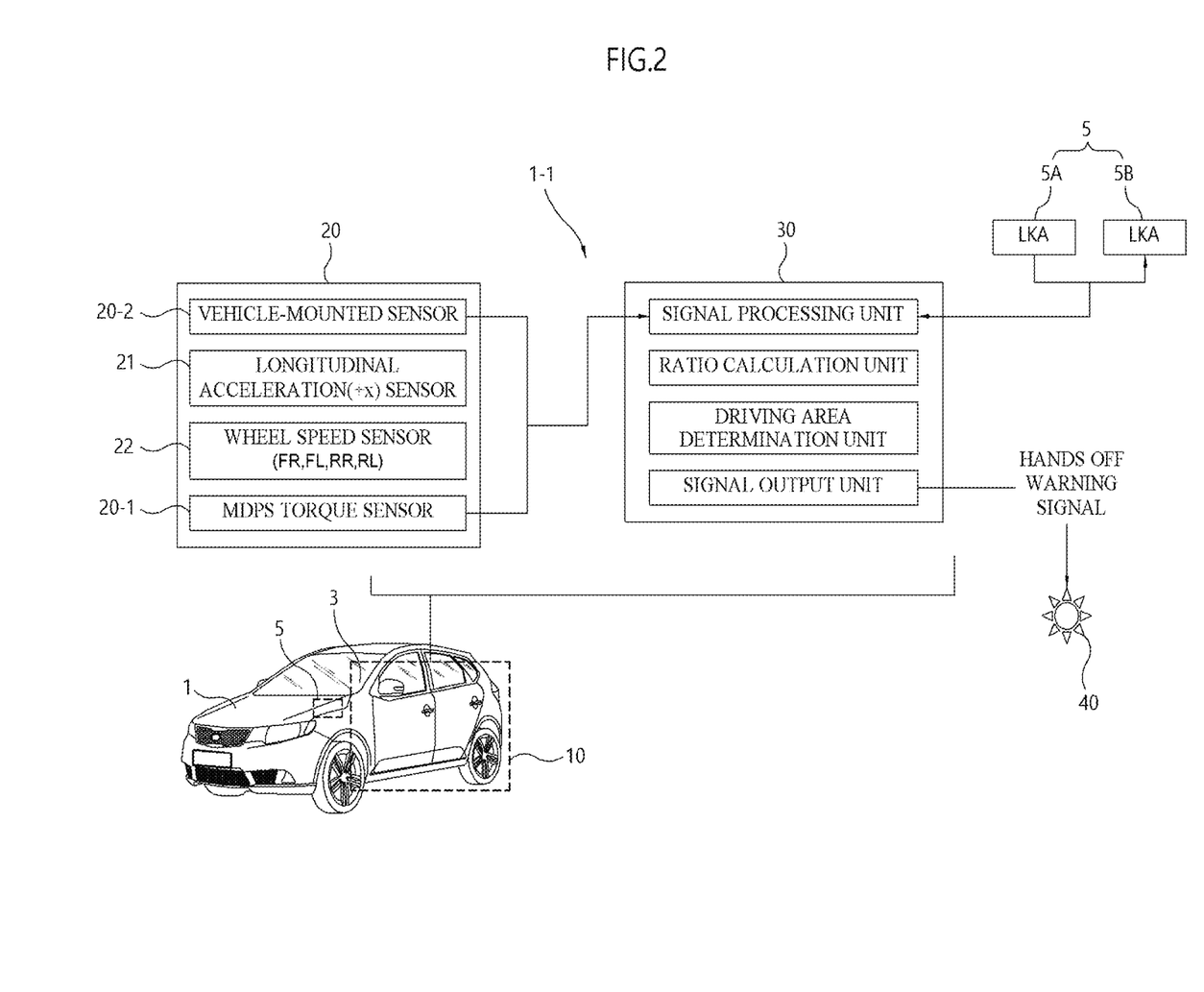
FIG. 2 illustrates an example where a driver's hands on/off detection system in which driver's hands on/off detection performance improvement control is implemented during driving according to the present disclosure is applied to the vehicle.

Referring to FIG. 2, a vehicle 1 includes a driver's hands on/off detection system 10 connected with a driving assistance system 5.

In particular, the driving assistance system 5 includes a lane keeping assist system (LKA) 5A and/or a lane following assist system (LFA) 5B. In this case, the vehicle 1 may include a driving assistance button to activate the driving assistance system 5 or may determine a vehicle driving state (for example, constant speed driving or cruise driving).

For example, the LKA 5A only operates when there is a risk of departure from a lane, as in the case of performing a function to return the vehicle 1 to the inside of the lane when the vehicle 1 traveling over a predetermined speed (for example, 60 km/h) departs from the lane, and the LFA 5B operates always, as in the case of performing a function of allowing the vehicle 1 to travel along the center of the lane by recognizing a lane ahead and the vehicle 1.

Specifically, the driver's hands on/off detection system 10 includes a vehicle sensor 20, a controller 30 and a warning lamp 40.

For example, the vehicle sensor 20 is divided into a vehicle-mounted sensor 20-1 and a torque sensor 20-2. The vehicle-mounted sensor 20-1 is a longitudinal acceleration sensor 21 and a wheel speed sensor 22, and the torque sensor 20-2 is an MDPS torque sensor mounted on an electronic motor driven power steering system (MDPS) 3.

Therefore, the longitudinal acceleration sensor 21 detects a longitudinal acceleration in the longitudinal direction (that is, an x-direction in an xyz coordinate system) among accelerations of the vehicle 1, the wheel speed sensor 22 is installed on each of left/right front wheels (FL/FR) and left/right rear wheels (RL/RR) of the vehicle 1 to detect a wheel speed, and the torque sensor 20-2 detects a magnitude of a steering torque generated when the driver grasps and rotates a steering wheel.

For example, the controller 30 operates as a central processing unit (that is, a CPU) which performs data detection, calculation and computation for controlling in connection with a memory in which a logic for the operation condition (S10) check of the driving assistance system, the sensor detection (S20), the variable selection control (S30), the disturbance condition determination (S40), the disturbance/normal driving area check (S50-1, S50-2), the sensor detection correction control (S60-1), the sensor detection holding control (S60-1), the sensor detection control (S70) and so on is stored by being programmed.

To this end, the controller 30 includes a signal processing unit 31, a ratio calculation unit 32, a driving area determination unit 33 and a signal output unit 34.

For example, the warning lamp 40 is provided in a driver's side cluster of the vehicle 1, and warns a driver's hands off detection situation on the steering wheel in the operating condition of the driving assistance system. To this end, the warning lamp 40 may be implemented by a buzzer or a light emitting diode (LED) bulb.

Hereinafter, the method of detecting the driver's hands on/off during driving in FIGS. 1A and 1B will be described in detail with reference to FIGS. 2 to 7. In this case, a control subject is the controller 30, and a control object is components of the driver's hands on/off detection system 10.

First, the controller 30 performs the step of entering operation of the driving assistance system of S10, which may be performed by recognizing constant speed driving and/or cruise driving or button manipulation for a driving assistance action among driving information of the vehicle 1 or by detection information of an engine rpm sensor or a vehicle speed sensor among the vehicle-mounted sensors 20-1.

As a result, in the entry to the operation of the driving assistance system (S10), the LKA 5A and/or the LFA 5B of the driving assistance system 5 is in an operating state (that is, in an activated state) while the condition of the vehicle 1 is satisfied.

Subsequently, the controller 30 enters the sensor detecting step (S20), and the sensor detecting step (S20) is performed through driver's hands on/off determination sensor check step of S21, vehicle sensor measurement value pre-processing step of S22, disturbance frequency signal extracting step of S23, vehicle measurement data representative value selecting step of S24, and MDPS torque representative value selecting step of S25.

Referring to FIG. 2, the controller 30 checks the longitudinal acceleration sensor 21, the wheel speed sensor 22 and the torque sensor 20-2 in the signal processing unit 31 which receives an activation (that is, an operation ON) signal of the LKA 5A and/or the LFA 5B), and reads and checks a longitudinal acceleration detection value of the longitudinal acceleration sensor 21, a wheel speed detection value (or a wheel rpm detection value) of the wheel speed sensor 22 for all or at least any one of the left/right front wheels and the left/right rear wheels and a steering torque detection value of the torque sensor 20-2.

For example, the driver's hands on/off determination sensor check (S21) may add determination on a disturbance generation condition by utilizing one or more sensor information of the acceleration sensor (x-direction) and the wheel speed sensor (FR, FL, RR, RL) among sensors already installed in the vehicle, while maintaining as it is the existing hands on/off determination method using the MDPS torque sensor.

Figure 3:
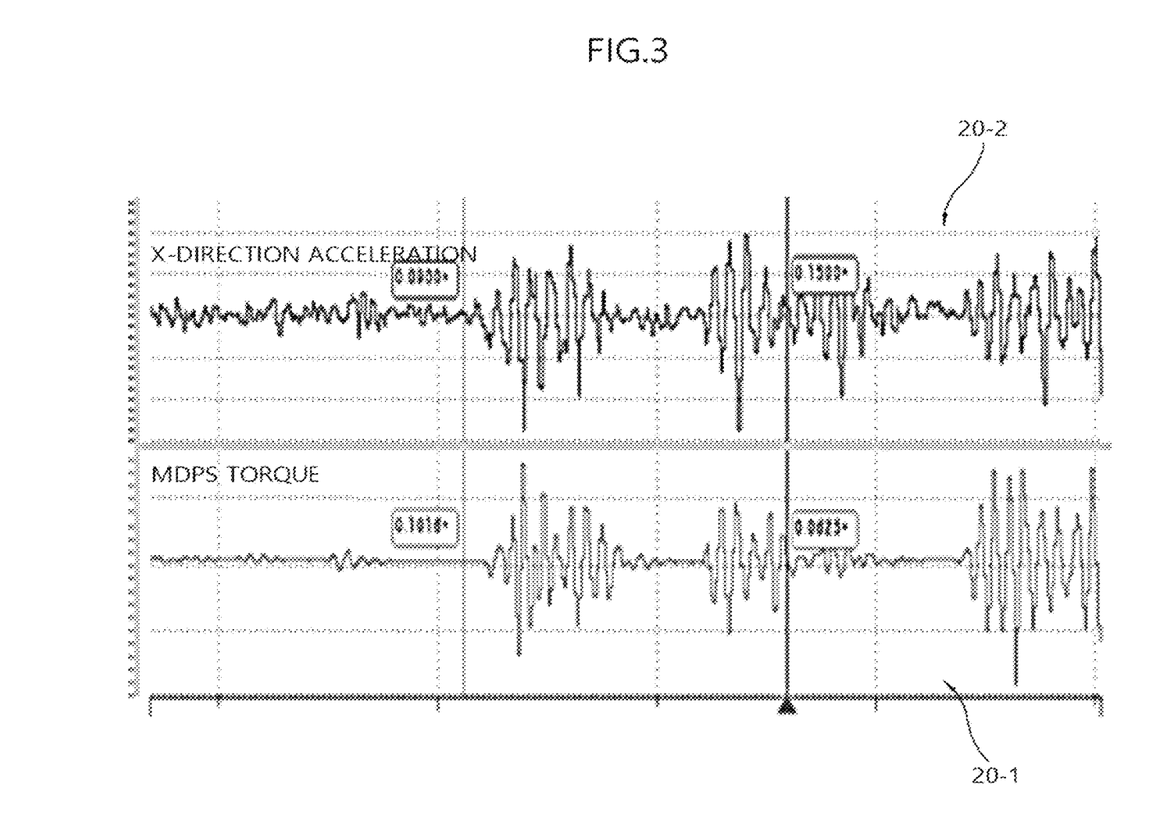
FIG. 3 illustrates a state of a longitudinal acceleration measurement value of a vehicle-mounted sensor and a torque measurement value of an MDPS torque sensor during disturbance driving of a vehicle according to the present disclosure.

For example, the vehicle sensor measurement value pre-processing (S22) is performed by filtering a signal using a frequency filter with a suitable band for a high frequency of the MDPS torque sensor and a high frequency of an x-direction acceleration checked in FIG. 3. The disturbance frequency signal extraction (S23) is performed by a sensor disturbance frequency signal and an MDPS disturbance frequency signal from a result of the frequency filter. Therefore, the filtering disturbance frequency signal is a result of filtering the high frequency of the MDPS torque sensor and the high frequency of the x-direction acceleration, and checking and filtering processing for detection values is performed in real time while the vehicle is driven, so that a plurality of different magnitudes are extracted until hands off is detected.

For example, the vehicle measurement data representative value selection (S24) selects a representative sensor disturbance frequency signal of the sensor disturbance frequency signals as the vehicle measurement data representative value, and the MDPS torque representative value selection (S25) selects a representative MDPS disturbance frequency signal of the MDPS disturbance frequency signals as an MDPS torque representative value.

Referring to FIG. 3, a frequency diagram is illustrated in which an x-direction acceleration (that is, a longitudinal acceleration) of a vehicle sensor measurement value while the vehicle is driven in a disturbance state is compared with an MDPS torque.

As shown, since disturbance transmitted to the vehicle 1 due to a barrier, stone, manhole and so on begins by an impact on a wheel of the vehicle, when signal strengths of the longitudinal wheel speed sensor 22 and the longitudinal acceleration sensor 21 are compared with a signal strength of the torque sensor 20-2 of the MDPS 5, a signal strength of the vehicle-mounted sensor 20-1 showing the acceleration frequency diagram in the x-direction is larger than a signal strength of the torque sensor 20-2 showing the MDPS torque frequency diagram, and a relatively high frequency signal is generated at the signal strength.

From this, the disturbance of the vehicle 1 due to the barrier, stone, manhole and so on is caused by the impact through the wheels of the left/right front wheels (FL/FR) and the left/right rear wheels (RL/RR) to spread throughout the vehicle, and the disturbance generated therethrough is measured by the longitudinal acceleration sensor 21, the wheel speed sensor 22 and the torque sensor 20-2, thereby serving as a cause for misdetection of hands on in a hands off situation.

Figure 4:
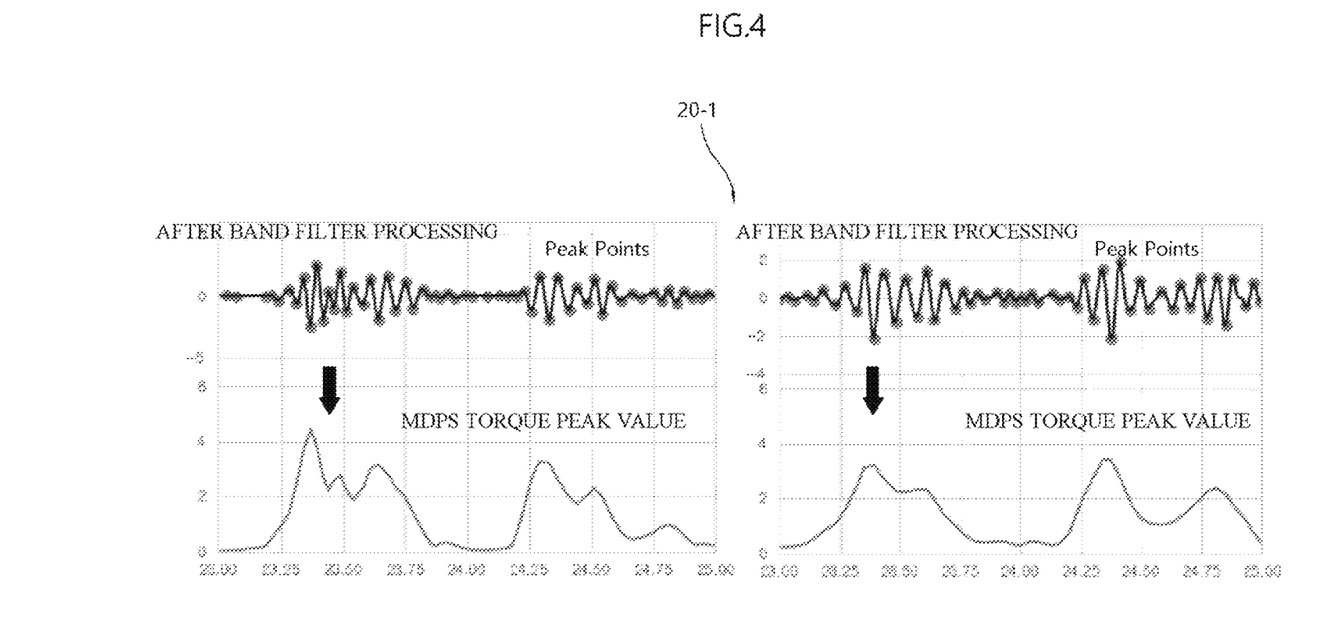
FIG. 4 illustrates an example of peak-peak calculation of a frequency signal for selecting an MDPS torque representative value among vehicle measurement data representative values according to the present disclosure.

Referring to FIG. 4, there is illustrated an example in which the representative MDPS torque value is selected by applying peak-peak to a frequency signal in the MDPS disturbance frequency signal. Therefore, it may be seen that the vehicle measurement data representative value is also selected by applying the peak-peak to a frequency signal. In this case, since the peak-peak application method is a conventional technique, detailed description is omitted.

In addition, the MDPS torque representative value and the vehicle measurement data representative value may be selected by applying overall level to a frequency band or applying amplitude to a frequency signal. In this case, since the overall level application method and the amplitude application method are conventional techniques, detailed description is omitted.

In succession, the controller 30 enters the disturbance variable selection step (S30), and the disturbance variable selection step (S30) is performed as representative value linearization processing step (S31) and representative value ratio calculation step between sensors (S32).

Referring to FIG. 2, the controller 30 performs the representative value linearization processing (S31) and the representative value ratio calculation between sensors (S32) by utilizing the ratio calculation unit 32 which is connected with the signal processing unit 31 to exchange information.

Figure 5:
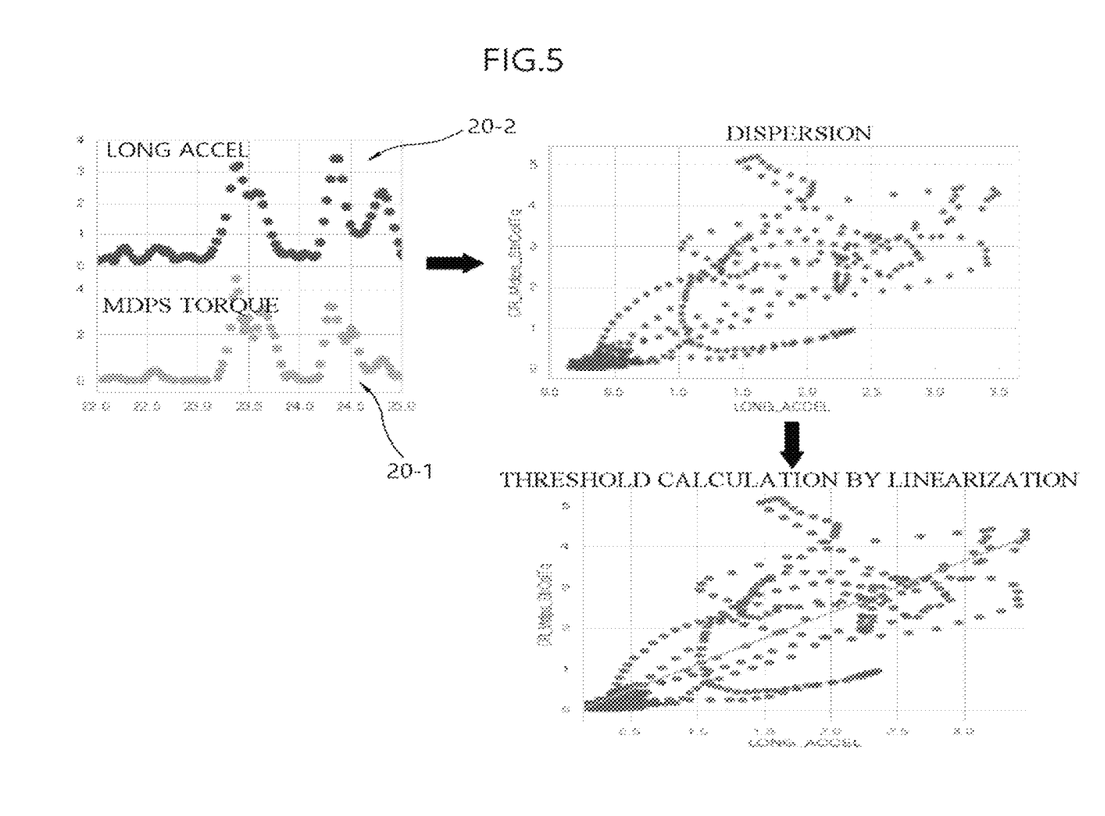
FIG. 5 illustrates an example of a dispersion and a linearization process for a longitudinal acceleration measurement value and an MDPS torque measurement value for setting a threshold during normal driving of a vehicle according to the present disclosure.

Referring to FIG. 5, the representative value linearization processing (S31) obtains a dispersion for each of the MDPS torque representative value (for example, marked as an MDPS torque) and the vehicle measurement data representative value (for example, marked as a LONG ACCEL), and is performed by executing the linearization for the dispersion.

In addition, the calculation of the representative value ratio between sensors (S32) calculates a ratio of values by comparing the vehicle measurement data representative value, between the MDPS torque representative value and the vehicle measurement data representative value being respectively linearized, with the MDPS representative value, and uses a normal threshold for normal driving by obtaining a threshold for a calculated ratio calculation value and then multiplying a margin. In this case, the magnitude of the margin is determined by calculating a ratio between a normal driving condition and a disturbance driving condition when developing a vehicle and considering a ratio value that may serve as a limit of the normal driving area.

Then, the controller 30 performs the disturbance condition checking (S40). The disturbance condition checking (S40) is performed by applying the following disturbance condition check formula.

Disturbance condition check formula: A>a? & B>b?, a=M×K

Here, "A" is a representative value ratio between sensors obtained through the calculation of a representative value ratio between sensors (S32), "a" is a disturbance driving threshold for the representative value ratio between the sensors, and "B" is an MDPS torque sensor detection value, "b" is an MDPS torque sensor threshold, "M" is a margin value considering a noise, "K" is a the sensor setting representative value ratio, ">" is an inequality representing the magnitude relationship between two values, and "&" means an and condition of two values.

From this, in the disturbance condition checking (S40), the representative value ratio A between sensors obtained in real time while the vehicle is driven is compared with a disturbance driving threshold (that is, a predetermined value) a, and the MDPS torque sensor detection value B is compared with an MDPS torque sensor threshold (that is, a predetermined value) b.

As a result, in the case where it is checked through "B>b" that the MDPS torque sensor detection value B is larger than the MDPS torque sensor threshold b and at the same time it is checked through "A>a" that the representative value ratio between sensors A is larger than the disturbance driving threshold a, it is determined that a current driving state of the vehicle 1 is in the disturbance driving area (S50-1).

On the other hand, in the case where it is checked through "B>b" that the MDPS torque sensor detection value B is larger than the MDPS torque sensor threshold b but it is not checked through "A>a" that the representative value ratio between sensors A is larger than the disturbance driving threshold a, it is determined that a current driving state of the vehicle 1 is in the normal driving area (S50-2).

Figure 6:
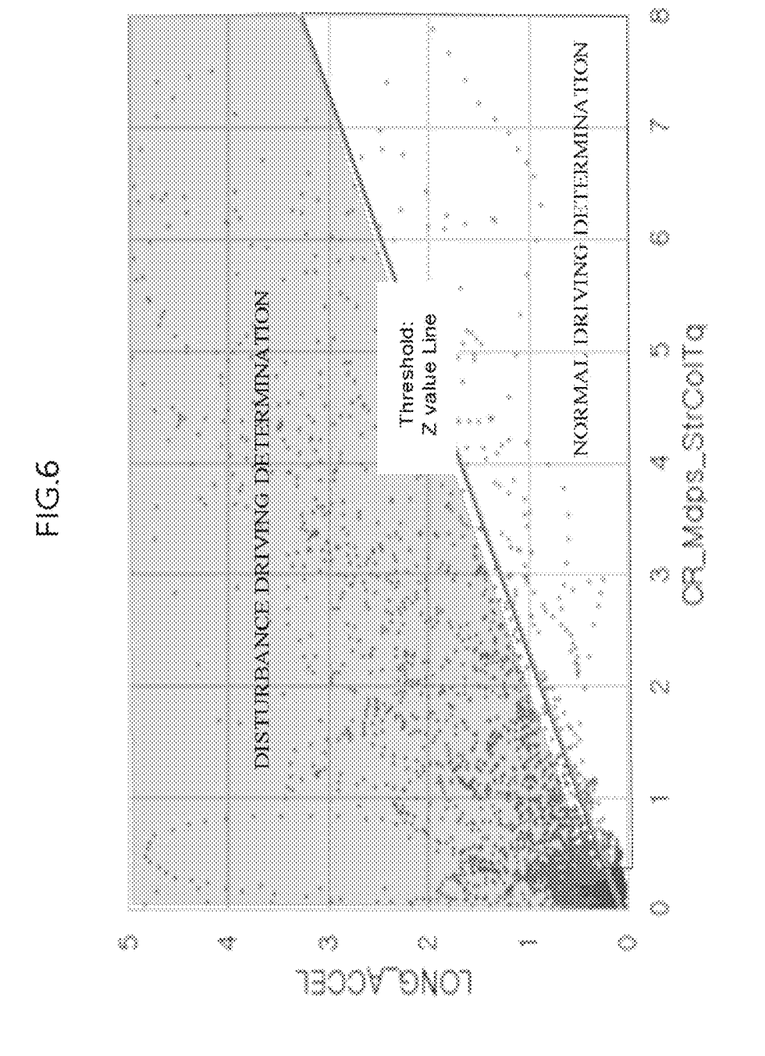
FIG. 6 illustrates an example of a diagram for determining a disturbance, which is applied during actual driving of a vehicle according to the present disclosure.

Referring to a disturbance driving determination map of FIG. 6, it may be seen that the disturbance driving threshold a is set as a Z line value of 0.73, the disturbance driving determination is made when a value is larger than 0.73 and the normal driving determination is made when a value is less than 0.73.

From this, it may be seen that a hands on/off logic of the disturbance area may be identified as a separate logic from a hands on/off logic of the normal driving area, based on the value of 0.73.

Finally, the controller 30 performs the disturbance-based detection step (S60-1) or the disturbance-based detection holding step (S60-1) in the disturbance driving area (S50-1), and on the other hand, performs the torque-based detection step (S70) in the normal driving area (S50-2).

Referring to FIG. 2, the controller 30 outputs, to the outside, a signal of the driving area determination unit 33 through the driving area determination unit 33 and the signal output unit 34 which exchange information in connection with the ratio calculation unit 32.

Therefore, the driving area determination unit 33 stores the disturbance driving determination map of FIG. 6 in a memory to determine disturbance driving and normal driving, and the signal output unit 34 outputs a signal as a result of detecting the driver's hands off to the warning lamp 40 to warn the driver that his or her hands have fallen off the steering wheel during the operation of the LKA 5A and/or LFA 5B.

In particular, the disturbance-based detection step (S60-1) is performed by hands off detection disturbance mode step (S61), disturbance variable condition satisfaction checking step (S62), hands on checking step (S63) and hands off checking step (S64).

As an example, the hands off detection disturbance mode (S61) means entry to the disturbance-based detection step, and the disturbance variable condition satisfaction checking (S62) applies the following disturbance misdetection determination formula.

Disturbance misdetection determination formula: F<f?

Here, "F" is a torque filtering value (that is, a value after filtering at an MDPS low frequency filter), and "f" is a disturbance torque threshold.

In particular, the disturbance torque threshold f may be applied as an absolute value of about 1 Nm or less. However, the disturbance torque threshold f of 1 Nm or less may be set Torque-based detection determination formula: D<d? or E>e?

Here, "D" is a torque detection value, "d" applies about 0.5 Nm as a torque threshold, "E" is a torque change rate, and "e" applies about 10 Nm as a torque change rate threshold.

As a result, when, in case of "D>d", the torque detection value D which is detected and calculated by the torque sensor (20-2) of the MDPS 5 is less than the torque threshold d, or when, in case of "E>e", the torque change rate E is less than the torque change rate threshold e, the hands on checking (S73) is performed, whereas when either of the two values is larger, the hands off checking (S74) is performed, thereby turning on the warning lamp 40.

Figure 7:
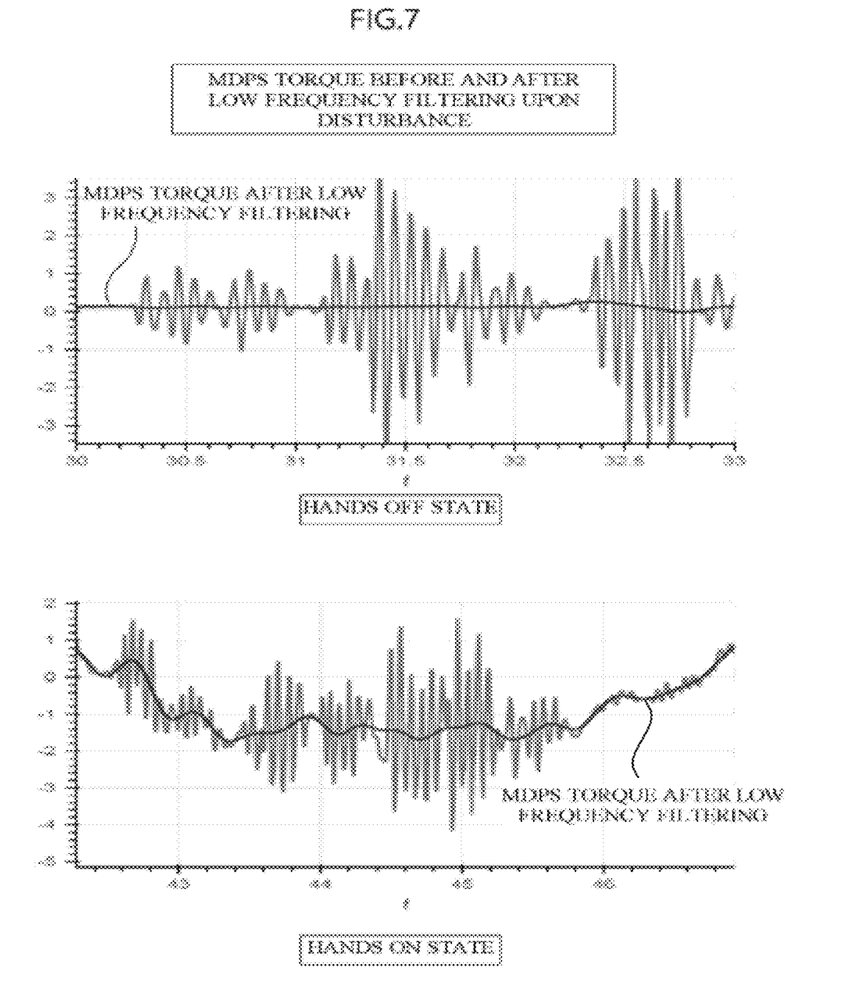
FIG. 7 illustrates an example of an MDPS torque diagram before and after a low frequency filter of hands on/off when a disturbance occurs during driving according to the present disclosure.

Referring to FIG. 7, from a frequency diagram for MDPS torque before/after low frequency filtering upon occurrence of disturbance, a simulation result based on a difference between the disturbance-based detection (S60-1) and the torque-based detection (S70) may be seen from the following Table 1.

TABLE 1

| SEPERATE MANAGEMENT OF HANDS OFF DETERMINATION CRITERIA | | | | | |
|---|---|---|---|---|---|
| DISTURBANCE AREA | HANDS OFF DETECTION VARIABLE | MDPS TORQUE VALUE | MDPS TORQUE CHANGE RATE | VALUE AFTER FILTERING AT MDPS LOW FREQUENCY FILTER | HANDS OFF |
| | DISTURBANCE AREA | DON'T CARE | | ABSOLUTE VALUE OF 1 NM OR LESS |   |
| NORMAL DRIVING AREA | NORMAL DRIVING AREA | 0.5 NM OR LESS | 10 NM OR MORE | DON'T CARE | HANDS ON | differently since the driver's grip strength holding the steering wheel may change to affect the torque detection value in a state which the disturbance is involved. Therefore, the specific numerical value applied as the disturbance torque threshold f should be handled as an example.

As a result, if the torque filtering value F in "F>f" is less than the disturbance torque threshold f, the hands on checking (S63) is performed, whereas if the torque filtering value F in "F>f" is larger than the disturbance torque threshold f, the hands off checking (S64) is performed, thereby turning on the warning lamp 40.

On the other hand, the disturbance-based detection holding step (S60-1) is converted into a hands on detection holding mode. Thus, hands on check is not performed, and feedback is made to the driver's hands on/off determination sensor check step of S21. In this case, the sensor detection holding control (S60-1) may be applied when the torque filtering value F is about at least 1.5 times the absolute value of the torque threshold f (that is, 1.5 Nm or more).

Therefore, the disturbance-based detection holding step (S60-1) does not proceed to the hands off checking step (S64) from the disturbance variable condition satisfaction checking step (S62) of the disturbance-based detection step (S60-1), and may be directly fed back to the driver hands on/off determination sensor check step (S21).

Specifically, the torque-based sensing step (S70) is performed as hands off detection normal mode step (S71), MDPS torque variable check step (S72), hands on checking step (S73) and hands off checking step (S74).

For example, the hands off detection normal mode (S71) means entry to the torque-based detection step, and the MDPS torque variable check (S72) applies the following torque-based detection determination formula.

From this, the torque value of the MDPS torque sensor 20-2 is checked differently in a hands off situation and a hands on situation. Therefore, it is proved that the accuracy and the reliability for an MDPS torque value is significantly improved compared to the conventional art even while using the MDPS torque sensor 20-2 as it is.

As described above, in the method for detecting the driver's hands on/off during driving in the driver's hands on/off detection system 10 applied to the vehicle 1 according to the present embodiment, during an operation of the driving assistance system 5 by the controller 30 while the vehicle 1 is driven, an MDPS torque representative value of a torque detection value and a vehicle measurement data representative value of a sensor detection value calculated by a frequency filtering process are calculated as a representative value ratio between sensors, the disturbance driving area (S50-1) and the normal driving area (S50-2) are divided by a magnitude of the representative value ratio between sensors in a state in which the torque detection value is checked, and the sensor detection correction control (S60-1) in which hands on/off check is recognized by applying a disturbance torque threshold to a torque filtering value of the torque detection value in the disturbance driving area (S50-1) or the torque-based detection control (S70) in which hands on/off check is recognized by applying an upper torque limit value and a lower torque limit value to a torque filtering value of the torque detection value in the normal driving area (S50-2) is performed.

Therefore, the driver's hands on/off detection system 10 may reduce a hands on/off detection error through the division of the disturbance driving area and the normal driving area, without using a capacitive sensor and, in particular, by correcting a post-processing result of a torque sensor measurement value by considering, as disturbance (or external noise), measurement values of the longitudinal acceleration sensor 21 and the wheel speed sensor 22 of the vehicle-mounted sensor 20-1 which is the basic sensing means of the vehicle 1.

What is claimed is:

1. A method for detecting a driver's hands on/off a steering wheel during driving of a vehicle, comprising:
dividing, by a controller, a disturbance driving area and a normal driving area by calculating a ratio between detection values of a torque sensor and a vehicle-mounted sensor during an operation of a driving assistance system; and
differently applying, by the controller in the disturbance driving area and the normal driving area, a torque sensor detection value of the torque sensor which detects the driver's hands on or hands off;
wherein differently applying the torque sensor detection value is performed by:
checking a torque detection value of the torque sensor, provided in an electronic motor driven power steering system (MDPS), during an operation of the driving assistance system; and
detection logic dualization control of varying a torque filtering value for the torque sensor detection value applied to a disturbance-based detection of detecting the driver's hands on or hands off in the disturbance driving area or a torque-based detection of detecting the driver's hands on or hands off in the normal driving area.

2. The method of claim 1, wherein the vehicle-mounted sensor is a longitudinal acceleration sensor which detects a longitudinal acceleration of the vehicle and a wheel speed sensor which detects wheel speeds for left/right front wheels and left/right rear wheels of the vehicle.

3. The method of claim 1, wherein the detection logic dualization control comprises:
a sensor detection step of calculating an MDPS torque representative value by a frequency filtering process for the torque detection value of the torque sensor and calculating a vehicle measurement data representative value for a sensor detection value of a vehicle-mounted sensor by the frequency filtering process;
a disturbance variable selection step of calculating a representative value ratio between sensors as a ratio of the MDPS torque representative value and the vehicle measurement data representative value;
a disturbance condition checking step of dividing a disturbance driving area and a normal driving area by a magnitude of the representative value ratio between sensors in a state in which the torque sensor detection value is checked; and
a detection logic dualization step of differently applying the torque filtering value after dividing the disturbance-based detection and the torque-based detection.

4. The method of claim 3, wherein the sensor detection step is performed by:
extracting disturbance frequency signals by pre-processing in real time the frequency filtering process for the torque sensor detection value and the sensor detection value; and
determining the vehicle measurement data representative value and the MDPS torque representative value by selecting a representative value from the disturbance frequency signals.

5. The method of claim 4, wherein selecting the representative value is determined by applying any one of peak-peak, overall level and amplitude to the disturbance frequency signals.

6. The method of claim 3, wherein the disturbance variable selection step is performed by:
obtaining dispersions for the MDPS torque representative value and the vehicle measurement data representative value, and linearizing the dispersions; and
calculating a ratio of the vehicle measurement data representative value and the MDPS representative value from linearization processing results, and calculating the representative value ratio between sensors, as a ratio calculation value.

7. The method of claim 6, wherein the representative value ratio between sensors is calculated by applying a margin to a threshold of the ratio calculation value.

8. The method of claim 3, wherein the disturbance condition checking step applies a torque sensor threshold for the torque sensor detection value and a disturbance driving threshold for the representative value ratio between sensors, as variables, and divides the disturbance driving area and the normal driving area according to a magnitude relationship of the variables.

9. The method of claim 8, wherein:
the disturbance driving area is a case in which the torque sensor detection value is larger than the torque sensor threshold and the representative value ratio between sensors is larger than the disturbance driving threshold, and
the normal driving area is a case in which the torque sensor detection value is larger than the torque sensor threshold but the representative value ratio between sensors is less than the disturbance driving threshold.

10. The method of claim 3, wherein the disturbance-based detection is performed by:
applying a disturbance torque threshold to a torque filtering value of the torque detection value, and comparing the torque filtering value and the disturbance torque threshold;
recognizing hands on check when the torque filtering value is less than the disturbance torque threshold; and
recognizing hands off check when the torque filtering value is larger than the disturbance torque threshold.

11. The method of claim 10, wherein a hands on detection holding mode of holding hands on check is applied when the torque filtering value is larger than the disturbance torque threshold.

12. The method of claim 10, wherein recognizing the hands off check turns on a warning lamp.

13. The method of claim 3, wherein the torque-based detection is performed by:
applying a torque threshold and a torque change rate to a torque filtering value of the torque detection value, and comparing the torque filtering value with any one of the torque threshold and the torque change rate;
recognizing hands on check when the torque filtering value is less than any one of the torque threshold and the torque change rate; and
recognizing hands off check when the torque filtering value is larger than any one of the torque threshold and the torque change rate.

14. The method of claim 13, wherein the recognizing of the hands off check turns on the warning lamp.

15. A system for detecting a driver's hands on/off, comprising:

a longitudinal acceleration sensor and a wheel speed sensor generating sensor detection values;

a torque sensor mounted on an electronic motor driven power steering system (MDPS) and detecting a torque detection value; and a controller configured to calculate an MDPS torque representative value of a torque detection value and a vehicle measurement data representative value of a sensor detection value calculated by a frequency filtering process during an operation of a driving assistance system in a driving state of a vehicle, as a representative value ratio between sensors, divide a disturbance driving area and a normal driving area by a magnitude of the representative value ratio between sensors in a state in which the torque detection value is checked, and perform sensor detection correction control in which hands on/off check on a steering wheel is recognized by applying a disturbance torque threshold to a torque filtering value of the torque detection value in the disturbance driving area or torque-based detection control in which hands on/off check on the steering wheel is recognized by applying an upper torque limit value and a lower torque limit value to a torque filtering value of the torque detection value in the normal driving area.

16. The system of claim 15, wherein the driving assistance system is a lane keeping assist (LKA) system which returns a vehicle to an inside of a lane when the vehicle departs from the lane or a lane following assist (LFA) system which allows the vehicle to travel along the center of the lane.

17. The system of claim 15, wherein the controller is connected with a warning lamp, and turns on the warning lamp when hands off on the steering wheel is checked.

* * * * *